(12) United States Patent
Liu

(10) Patent No.: US 11,569,923 B2
(45) Date of Patent: Jan. 31, 2023

(54) METHOD AND APPARATUS FOR SENDING AND RECEIVING MULTIFRAME, AND STORAGE MEDIUM

(71) Applicant: ZTE CORPORATION, Guangdong (CN)

(72) Inventor: Feng Liu, Shenzhen (CN)

(73) Assignee: ZTE CORPORATION, Guangdong (CN)

( * ) Notice: Subject to any disclaimer, the term of this patent is extended or adjusted under 35 U.S.C. 154(b) by 0 days.

(21) Appl. No.: 16/466,706

(22) PCT Filed: Dec. 8, 2017

(86) PCT No.: PCT/CN2017/115285
§ 371 (c)(1),
(2) Date: Jun. 5, 2019

(87) PCT Pub. No.: WO2018/103740
PCT Pub. Date: Jun. 14, 2018

(65) Prior Publication Data
US 2020/0112383 A1    Apr. 9, 2020

(30) Foreign Application Priority Data

Dec. 8, 2016 (CN) .......................... 201611123813.5

(51) Int. Cl.
*H04J 3/16* (2006.01)
*H04J 3/06* (2006.01)

(52) U.S. Cl.
CPC .......... *H04J 3/1652* (2013.01); *H04J 3/0608* (2013.01); *H04J 3/1611* (2013.01); *H04J 3/1647* (2013.01); *H04J 2203/0085* (2013.01)

(58) Field of Classification Search
USPC ......................................................... 370/329
See application file for complete search history.

(56) References Cited

U.S. PATENT DOCUMENTS

| 9,226,254 B2 * | 12/2015 | Hole ................. H04W 56/0045 |
| 9,800,361 B2 * | 10/2017 | Gareau ................. H04L 49/351 |
| 2008/0130688 A1 | 6/2008 | Polland |
| 2010/0221005 A1 * | 9/2010 | Zhao ..................... H04J 3/1652 |
| | | 398/52 |

(Continued)

FOREIGN PATENT DOCUMENTS

| CN | 1308434 A | 8/2001 |
| CN | 101136703 A | 3/2008 |

(Continued)

OTHER PUBLICATIONS

The 8-bit parallel CRC-32 research and Implementation in USB 3.0 (Year: 2012).*

(Continued)

*Primary Examiner* — Jeffrey M Rutkowski
*Assistant Examiner* — Luna Weissberger
(74) *Attorney, Agent, or Firm* — Foley & Lardner LLP

(57) ABSTRACT

Provided are a method and apparatus for sending and receiving a multiframe, a communication device, and a communication network system. The method includes: determining a multiframe identifier used for identifying a multiframe number according to a number of timeslots of a physical layer, where the multiframe number is the number of frames constituting one multiframe; and sending the multiframe to a receiving end, where the multiframe carries the multiframe identifier. Further provided is a computer storage medium.

4 Claims, 14 Drawing Sheets

First communication device 212

Second communication device 214

Communication network system

(56) References Cited

U.S. PATENT DOCUMENTS

| | | | | |
|---|---|---|---|---|
| 2016/0119076 | A1* | 4/2016 | Gareau | H04Q 11/0066 |
| | | | | 398/49 |
| 2017/0005949 | A1* | 1/2017 | Gareau | H04L 12/413 |
| 2017/0012900 | A1* | 1/2017 | Singamsetty | H04L 45/42 |
| 2019/0149449 | A1* | 5/2019 | Morris | H04L 45/745 |
| | | | | 709/245 |

FOREIGN PATENT DOCUMENTS

| | | |
|---|---|---|
| CN | 101155016 A | 4/2008 |
| CN | 101296045 A | 10/2008 |
| CN | 101442692 A | 5/2009 |
| CN | 101668003 A | 3/2010 |
| EP | 2 058 961 A1 | 5/2009 |
| EP | 3013017 A1 | 4/2016 |

OTHER PUBLICATIONS

First Office Action for CN Appl. No. 201611123813.5, dated Dec. 18, 2019.

Extended European Search Report for EP Appl. No. 17878351.0, dated Jun. 15, 2020.

OIF: "IA OIF-FLEXE-01.0 Flex Ethernet Implementation Agreement", Mar. 1, 2016 (Mar. 1, 2016), pp. 1-31, XP055459137, Retrieved from the Internet: URL:http://www.oiforum.com/wp-content/uploads/OIF-FLEXE-01.0.pdf [retrieved on Mar. 14, 2018].

Second Office Action for CN Appl. No. 201611123813.5, dated May 29, 2020.

Yuanbin Zhang et al. (ZTE Corporation PRC): "Consideration and proposal on the atomic function model of FlexE over OTN;WD11-19", ITU-T Draft; Study Period 2013-2016, International Telecommunication Union, Geneva, CH, vol. 11/15, May 30, 2016 (May 30, 2016), pp. 1-4, XP044169582, Retrieved from the Internet: URL:https://www.itu.int/ifa/t/2013/sg15/ex change/wp3/qll/2016-06-Shenzhen/WD11-19 -ZT E FlexEatomic_Consideration.docx [retrieved on May 30, 2016].

International Search Report and Written Opinion for International Appl. No. PCT/CN2017/115285 , dated Feb. 24, 2018.

First Office Action on CN Appl. No. 202110513463.8 dated Dec. 27, 2021.

First Search Report on CN Appl. No. 202110513463.8 dated Dec. 20, 2021.

* cited by examiner

| 0 | 1 | 1 | 2 | 3 | 4 | | | | | 63 | 64 | 65 |
|---|---|---|---|---|---|---|---|---|---|---|---|---|
| 1 | 0 | | 0x4B | | C | OMF | RPF | RES | Bonding group number | 0X5 | 0X000_0000 | |
| 0 | 1 | C | PHY mapping | | | PHY number | | | Reserved | | | |
| 0 | 1 | C | Client calendar A | | | Client calendar B | | | CR | CA | Reserved | CRC-16 |
| S | S | | Manage channel-section | | | | | | | | | |
| S | S | | | | | | | | | | | |
| S | S | | Manage channel-shim to shim | | | | | | | | | |
| S | S | | | | | | | | | | | |
| S | S | | | | | | | | | | | |

FIG. 7

METHOD AND APPARATUS FOR SENDING AND RECEIVING MULTIFRAME, AND STORAGE MEDIUM

CROSS REFERENCE TO RELATED APPLICATIONS

This is a National Stage Application, filed under U.S.C. 371, of International Patent Application No. PCT/CN2017/115285, filed on Dec. 8, 2017 which claims priority to a Chinese patent Application No. 201611123813.5 filed on Dec. 8, 2016, the disclosures of both of which are incorporated herein by reference in their entireties.

TECHNICAL FIELD

The present disclosure relates to communications and, in particular, to a method and apparatus for sending and receiving a multiframe, a communication device, and a communication network system.

BACKGROUND

The rapid increase of user network information traffic has prompted the rapid development of communication network information transmission bandwidth. The interface bandwidth speed of communication equipment is increased from 10 M (unit: bit/second) to 100 M, and then increased to 1 G and 10 G. Currently, an interface bandwidth speed of 100 G has been achieved, and a large number of 100 G optical modules have been put into commercial use on the market. At present, 400 G optical modules have been developed, but the 400 G optical modules are expensive, exceeding the price of four 100 G optical modules, resulting in the lack of commercial economic value of 400 G optical modules.

To deliver 400 G services on 100 G optical modules, the International Organization for Standardization has defined the Flexible Ethernet (FlexE) protocol. The FlexE protocol bonds multiple 100 G optical modules to form a large-speed transmission channel. As shown in FIG. 1, four 100 G optical modules are bonded together by the FlexE protocol to form one 400 G transmission channel, which is equivalent to the transmission speed of one 400 G optical module, thereby solving the transmission requirements of 400 G services without increasing costs.

At present, a physical layer defined by the FlexE protocol is 100 and 20 timeslots are defined on the 100 G physical layer. At the same time, an FlexE multiframe structure defined by the FlexE protocol is composed of 32 frames, among which the first 20 frames can be used to transmit the configuration information of each timeslot and the corresponding position of the last 12 frames is temporarily reserved. For 5 G, 200 G, 400 G and other physical layers, the configuration information of each timeslot cannot be transmitted using the original multiframe structure.

In the existing art, the multiframe structure is single and limited, and the multiframe composed of 32 frames cannot be applied to physical layers having different bandwidths, causing the problem of poor bandwidth compatibility between the multiframe and different bandwidth interfaces.

SUMMARY

Embodiments of the present disclosure provide a method and apparatus for sending and receiving a multiframe, a communication device, a communication network system, and a computer storage medium to solve at least the problem of poor bandwidth compatibility between the multiframe defined by the FlexE protocol and different interfaces in the existing art.

According to an embodiment of the present disclosure, a method for sending a multiframe is provided. The method includes: determining, according to a number of timeslots of a physical layer, a multiframe identifier for identifying a multiframe number, where the multiframe number is a number of frames constituting the multiframe; and sending the multiframe to a receiving end, where the multiframe identifier is carried in the multiframe.

According to another embodiment of the present disclosure, a method for receiving a multiframe is provided. The method includes: extracting a multiframe identifier for identifying a multiframe number from received frames, where the multiframe number is a number of frames constituting one multiframe; and receiving multiframe data according to the extracted multiframe identifier.

According to another embodiment of the present disclosure, an apparatus for sending a multiframe is provided. The apparatus includes: a first determining module, which is configured to determine, according to a number of timeslots of a physical layer, a multiframe identifier for identifying a multiframe number, where the multiframe number is a number of frames constituting one multiframe; and a sending module, which is configured to send the multiframe to a receiving end, where the multiframe identifier is carried in the multiframe.

According to another embodiment of the present disclosure, a communication device is provided. The communication device includes: a processor and a transmission apparatus. The processor is configured to determine, according to a number of timeslots of a physical layer, a multiframe identifier for identifying a multiframe number, where the multiframe number is a number of frames constituting one multiframe. The transmission apparatus is configured to send the multiframe to a receiving end, where the multiframe identifier is carried in the multiframe.

According to another embodiment of the present disclosure, a communication network system is provided. The communication network system includes: a first communication device and a second communication device. The first communication device is configured to determine, according to a number of timeslots of a physical layer, a multiframe identifier for identifying a multiframe number, where the multiframe number is a number of frames constituting one multiframe; and send the multiframe to a receiving end, where the multiframe identifier is carried in the multiframe. The second communication device is configured to: extract a multiframe identifier for identifying a multiframe number from received frames; and receive multiframe data according to the extracted multiframe identifier.

According to another embodiment of the present disclosure, a computer storage medium is provided. The storage medium is configured to store computer-executable codes, where, after being executed, the computer-executable codes are capable of implementing the method provided in the preceding one or more technical solutions.

In embodiments of the present disclosure, first, the multiframe structure (for example, the number of frames included in the multiframe structure (which may be basic frames and basic units constituting the multiframe) is determined according to the number of timeslots of the physical layer and thus is not limited to the multiframe structure composed of merely 32 frames in the existing art, achieving flexible configuration of frames. Meanwhile, the number of timeslots of the physical layer corresponds to the bandwidth that the interface can provide and is compatible with bandwidths that physical layers of different interfaces can provide.

Second, the multiframe structure can be flexibly configured. To solve the result of the flexibly configured current multiframe, the multiframe identifier indicating the number of frames in the current multiframe is determined according to the determined number of frames included in the multiframe, and the multiframe identifier is carried in the multiframe and sent to the receiving end. When receiving the multiframe, the receiving end receives the multiframe identifier of the multiframe. According to the multiframe identifier, the receiving end can know the multiframe boundary. For example, the number of frames included in the current multiframe and the start frame and the end frame of the current multiframe are determined, so that information carried in the multiframe is extracted. In this way, information about the flexible multiframe is sent and received between the transmitting end and the sending end.

In summary, the technical solutions provided in embodiments of the present disclosure can flexibly configure the number of frames included in the multiframe according to the bandwidths of different interfaces. Therefore, the solutions can solve the problem of poor bandwidth compatibility between the multiframe structure in the FlexE protocol and different interfaces in the existing art and achieve the effect of improving bandwidth compatibility between the multiframe structure in the FlexE protocol and different interfaces.

BRIEF DESCRIPTION OF DRAWINGS

The drawings described herein are used to provide a further understanding of the present disclosure and form a part of the present application. The exemplary embodiments and descriptions thereof in the present disclosure are used to explain the present disclosure and not to limit the present disclosure in any improper way. In the accompanying drawings:

FIG. 7 is a schematic diagram illustrating a frame structure in the FlexE protocol according to optional embodiments of the present disclosure;

DETAILED DESCRIPTION

The present disclosure will be described hereinafter in detail with reference to the drawings in conjunction with the embodiments. It is to be noted that if not in collision, the embodiments and features therein in the present application may be combined with each other.

It is to be noted that the terms "first", "second" and the like in the description, claims and drawings of the present disclosure are used to distinguish between similar objects and are not necessarily used to describe a particular order or sequence.

Embodiment One

Figure 2:
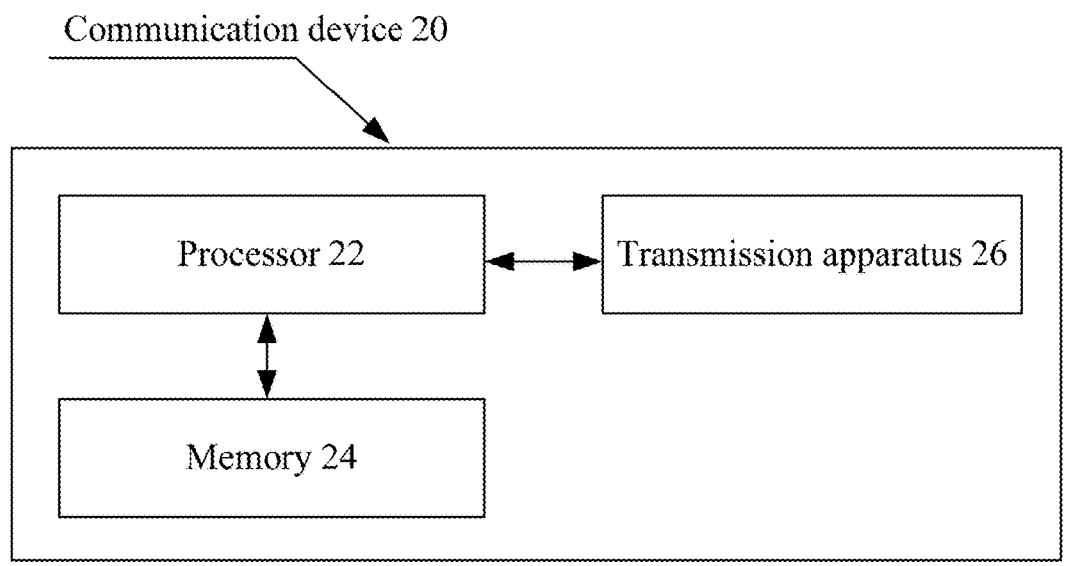
FIG. 2 is a block diagram illustrating a hardware structure of a communication device for implementing a method for sending a multiframe according to embodiments of the present disclosure.

A method embodiment provided in embodiment one of the present application may be executed in a communication device, a computer terminal or other similar computing apparatuses. Using running in the communication device as an example, FIG. 2 is a block diagram illustrating a hardware structure of a communication device for a method for sending a multiframe according to embodiments of the present disclosure. As shown in FIG. 2, a communication device 20 may include one or more (merely one is shown in the figure) processors 22 (the processor 22 may include, but is not limited to, a microprocessor MCU, a programmable logic device FPGA or other processing apparatuses), a memory 24 for storing data, and a transmission apparatus 26 for implementing a communication function. It is to be understood by those skilled in the art that the structure shown in FIG. 2 is merely illustrative and not intended to limit the structure of the preceding electronic apparatus. For example, the communication device 20 may further include more or fewer components than the components shown in FIG. 2, or may have a configuration different from the configuration shown in FIG. 2.

The memory 24 may be configured to store software programs of application software, and modules, such as program instructions/modules corresponding to the method for sending a multiframe in embodiments of the present disclosure. The processor 22 executes the software programs and modules stored in the memory 24 to perform functional applications and data processing, that is, to implement the preceding method. The memory 24 may include a high-speed random access memory, and may further include a nonvolatile memory, such as one or more magnetic storage devices, flash memories or other nonvolatile solid-state memories. In some examples, the memory 24 may further include memories that are remotely disposed with respect to the processors 22. These remote memories may be connected to the communication device 20 via a network. Examples of the preceding network include, but are not limited to, the Internet, an intranet, a local area network, a mobile communication network and a combination thereof.

The transmission apparatus 26 is configured to receive or send data via a network. Specific examples of such a network may include a wireless network provided by a communication provider of the communication device 20. In one example, the transmission apparatus 26 includes a network interface controller (NIC), which may be connected to other network devices via a base station, thereby communicating with the Internet. In one example, the transmission apparatus 26 may be a radio frequency (RF) module, which is configured to communicate with the Internet wirelessly.

Figure 3:
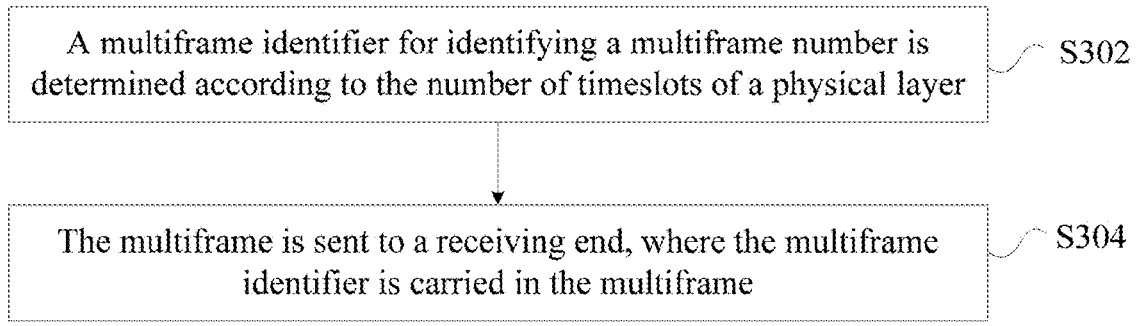
FIG. 3 is a flowchart of a method for sending a multiframe according to embodiments of the present disclosure.

A method for sending a multiframe running on the communication device is provided in this embodiment. FIG. 3 is a flowchart of a method for sending a multiframe according to embodiments of the present disclosure. As shown in FIG. 3, the process of the method includes the steps described below.

In step S302, a multiframe identifier for identifying a multiframe number is determined according to the number of timeslots of a physical layer, where the multiframe number is the number of frames constituting one multiframe.

In S304, the multiframe is sent to a receiving end, where the multiframe identifier is carried in the multiframe.

The preceding steps in which a multiframe identifier for identifying a multiframe number (which means the number of frames constituting one multiframe) is determined according to the number of timeslots of a physical layer, and the multiframe that carrying the multiframe identifier is sent to a receiving end solve the problem of poor bandwidth compatibility between the multiframe structure in the FlexE protocol and different interfaces in the existing art and improve bandwidth compatibility between the multiframe structure in the FlexE protocol and different interfaces.

Optionally, the multiframe number may be nth power of 2, where the n is a minimum positive integer that causes the multiframe number greater than or equal to the number of the timeslots. The multiframe number may also be other positive integers greater than or equal to the number of timeslots. Limiting the multiframe number to the preceding form makes the subframe structure of the multiframe symmetrical and easy to design.

Optionally, the multiframe identifier may be carried in the multiframe in the following manner: identifier values of the multiframe identifier are sequentially carried in preset positions of overhead blocks of respective frames constituting the multiframe, where the number of the identifier values is the same as the multiframe number. The multiframe identifier may be a character string consisting of "0" and "1". For example, the identifier values of the multiframe identifier are a preset number of consecutive "0"s and the preset number of consecutive "1"s in sequence, where the multiframe number is an even number and the preset number is half of the multiframe number. That is, the determined multiframe identifier is a character string consisting of m consecutive 0s and m consecutive 1s, and the value of m is half of the multiframe number.

Two or more adjacent characters in the character string corresponding to the multiframe identifier are carried by different frames in the multiframe. For example, the multiframe identifier of a multiframe is the character string "00001111". The multiframe identifier is carried by 8 frames in the multiframe. One frame carries one character of the character string. For example, the first four consecutive frames in the multiframe carry the character "0", and the last four consecutive frames in the multiframe carry the character "1". For example, carrying by using preset positions of different frames enables separate sending of the same character "0" or "1".

In some embodiments, after receiving the multiframe, the receiving end extracts the characters constituting the multiframe identifier from the preset positions, and then combines the extracted characters to form the multiframe identifier. Since the multiframe identifier consists of a preset number of "0"s and a preset number "1"s, after receiving a preset number of "0"s and a preset number "1"s, the receiving end can determine the number of frames included in the current multiframe in advance according to the number of "0"s in the multiframe identifier, thereby determining the multiframe boundary, accelerating the determination of the multiframe structure and the multiframe boundary.

Optionally, when the number of frames included in the multiframe is determined, the number of frames included in the multiframe can be accurately determined in conjunction with the multiframe identifier and the bandwidths of different interfaces.

Optionally, a preset position for sending an identifier value is an Overhead Multiframe Indicator (OMF) field of respective one of the overhead blocks. Using the structure of the existing overhead block can improve the forward compatibility of the method for sending a multiframe.

Optionally, before step S302, the number of timeslots may also be determined according to the interface bandwidth speed of the physical layer. The relationship between the interface bandwidth speed and the number of timeslots may be that the number of timeslots is equal to the interface bandwidth speed divided by 5G. The interface here may be in various forms, such as an optical interface.

Optionally, in step S302, the multiframe identifier may be determined in multiple manners. For example, the multiframe number is determined according to the number of timeslots of the physical layer and then the multiframe identifier for identifying the multiframe number is determined according to the multiframe number.

As another example, a correspondence between the preset number of timeslots and the multiframe identifier may be preset, and the multiframe identifier corresponding to the number of timeslots is directly determined according to the correspondence.

As another example, in step S302, the corresponding multiframe identifier may be directly determined according to the bandwidth speed of the physical layer and the correspondence between the bandwidth speed and the multiframe identifier.

The hardware structure of the communication device for the data receiving method in this embodiment of the present disclosure is similar to that of the preceding communication device 20, and is not described herein.

Figure 4:
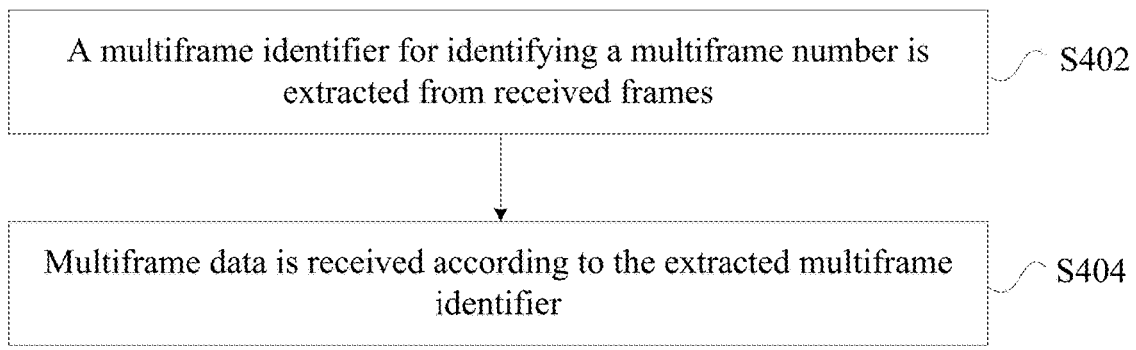
FIG. 4 is a flowchart of a method for receiving a multiframe according to embodiments of the present disclosure.

A method for receiving a multiframe is further provided in this embodiment. FIG. 4 is a flowchart of a method for receiving a multiframe according to embodiments of the present disclosure. As shown in FIG. 4, the process of the method includes the steps described below.

In step S402, a multiframe identifier for identifying a multiframe number is extracted from received frames, where the multiframe number is the number of frames constituting one multiframe.

In step S404, multiframe data is received according to the extracted multiframe identifier.

The preceding steps in which in a multiframe identifier for identifying a multiframe number (which means the number of frames constituting one multiframe) is extracted from received frames, and multiframe data is received according to the extracted multiframe identifier solve the problem of poor bandwidth compatibility between the multiframe structure in the FlexE protocol and different interfaces in the existing art and improve bandwidth compatibility between the multiframe structure in the FlexE protocol and different interfaces.

Optionally, the step S402 may be implemented in the following manner: identifier values of the multiframe identifier are extracted sequentially in preset positions of overhead blocks of respective received frames, where the number of the identifier values is the same as the multiframe number. Of course, the multiframe identifier may be extracted at other positions of the received frames, as long as the receiving end and the sending end can determine the preset positions according to mutual agreement or protocol.

Optionally, a preset position may be an OMF field of respective one of the overhead blocks.

Optionally, step S404 may receive multiframe data in the following manner: a multiframe boundary is determined according to the extracted identifier values of the multiframe identifier; and the multiframe data is received according to the determined multiframe boundary. The multiframe boundary is determined so that the start and end positions of each multiframe can be determined and a complete multiframe can be determined, facilitating receiving of the multiframe data.

Optionally, after step S402, whether a received multiframe identifier is correct is determined according to the number of the extracted identifier values and a receiving sequence; and in condition that a determining result is correct, the multiframe data is received according to the extracted multiframe identifier.

Optionally, the preceding method for sending a multiframe and method for receiving a multiframe may be applied to a networking system based on the FlexE protocol.

On the basis of the preceding embodiments and optional embodiments, to explain the entire process interaction of the solution, in this optional embodiment, a multiframe indication method in the FlexE protocol is provided, including a method for sending a multiframe at a sending end and a method for receiving a multiframe at a receiving end. The method is can be applied to a system including a sending end and a receiving end. The method is described below.

Figure 1:
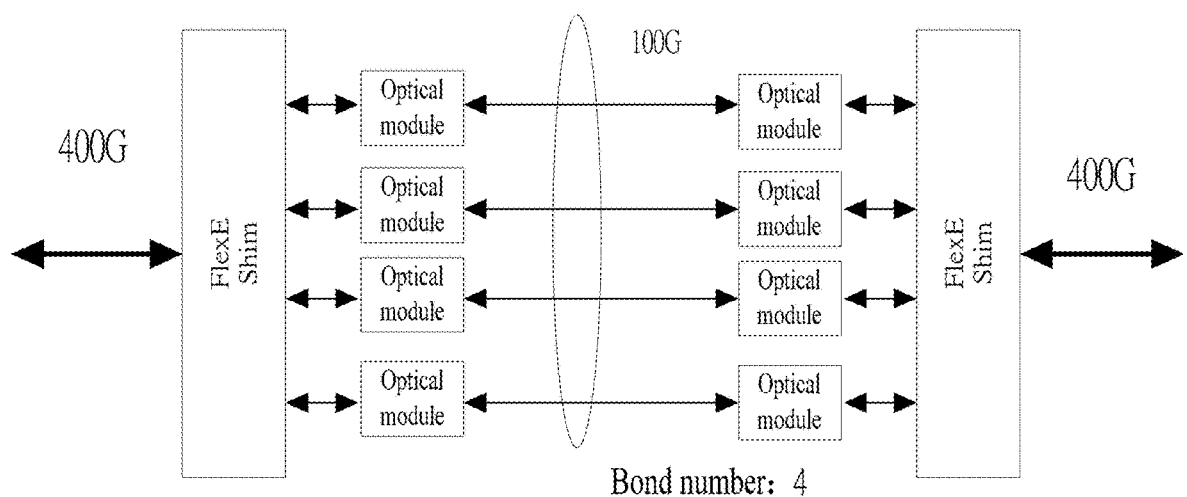
FIG. 1 is a schematic diagram illustrating an application of a FlexE protocol in the existing art.

In the past ten years, network traffic has been growing at a high speed, which has led to a rapid increase in the service bandwidth of communication equipment. The interface speed of communication equipment has increased from a 10 M bandwidth to a 100 M bandwidth, and then to 1 G and 10 G. Every few years, the service speed is multiplied to meet the requirements of traffic on the network. At present, commercial optical modules of communication equipment have reached a speed of 100 G and have been put into commercial use in a large scale. When the speed of optical modules begins to exceed 100 the technical difficulties encountered in the development of optical modules are increasing and the production costs of optical modules are drastically increasing. In the development from 100 G to 400 although 400 G optical modules have been developed, the price of 400 G optical modules is more expensive than the price of four 100 G optical modules, resulting in the lack of commercial economic value of 400 G optical modules. To meet the requirements of transmitting 400 G services on 100 G optical modules without increasing costs, the International Organization for Standardization has defined the FlexE protocol. The FlexE protocol bonds multiple 100 G optical modules to form a transmission channel having a large service speed. As shown in FIG. 1, four 100 G optical modules are bonded together by the FlexE protocol to form one 400 G transmission channel, which is equivalent to the transmission speed of one 400 G optical module, thereby not merely meeting the transmission requirements of 400 G services but also solving the problem of the economic value of service transmission.

Figure 5:
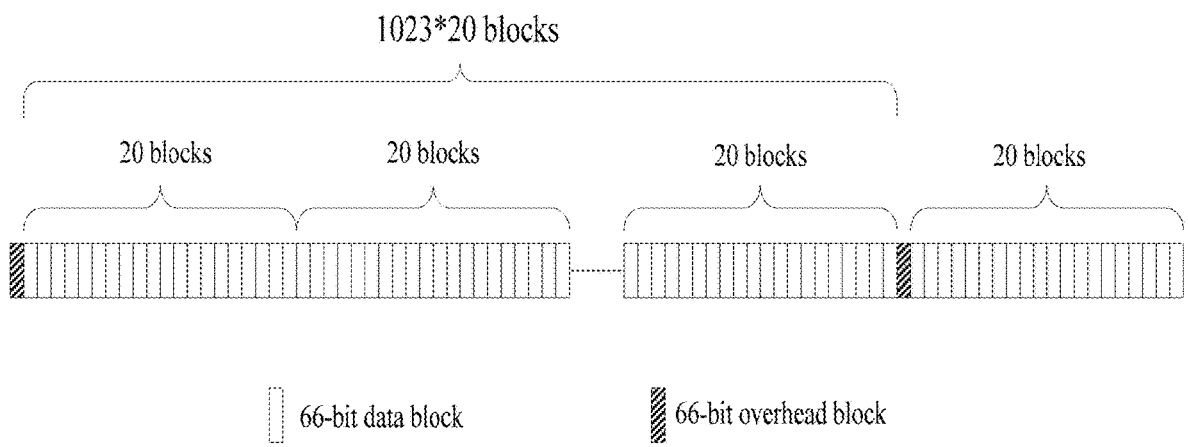
FIG. 5 is a schematic diagram illustrating an arrangement of overhead blocks and data blocks in the FlexE protocol according to optional embodiments of the present disclosure.

At present, a physical layer defined by the FlexE protocol has a rate of 100 G In an optical module, 64/66 encoding is performed on a 100G data packet before the 100G data packet is sent. A 64-bit data block is expanded into a 66-bit information block. The added 2 bits are located in the front of the 66-bit block to serve as the leading flag of the 66-bit block. After that, the 100G data packet is sent out from an optical port in the form of the 66-bit block. In the receiving process, the optical port discriminates the 66-bit block from the received data stream, recovers the original 64-bit data from the 66-bit block, and obtains the data packet by way of recombination. The FlexE protocol is in the 64-bit to 66-block conversion layer. The 66-bit data block is sorted and planned before the 66-bit data block is sent. As shown in FIG. 5, for a 100 G service, every 20 66-bit data blocks are classified into one data block group. Each group has 20 data blocks, which represent 20 timeslots. Each timeslot represents a service speed of 5G bandwidth. During transmission of 66-bit data blocks, each time 1023 data block groups (1023×20 data blocks) are sent out, one FlexE overhead block (which is indicated by a black block in FIG. 5) is inserted. After one overhead block is inserted, data blocks continue being transmitted. After the second group of 1023×20 data blocks are sent out, another overhead block is inserted. The rest can be done in the same manner. In this way, during transmission of data blocks, an overhead block is periodically inserted. The interval between two adjacent overhead blocks is 1023×20 data blocks.

Figure 6:
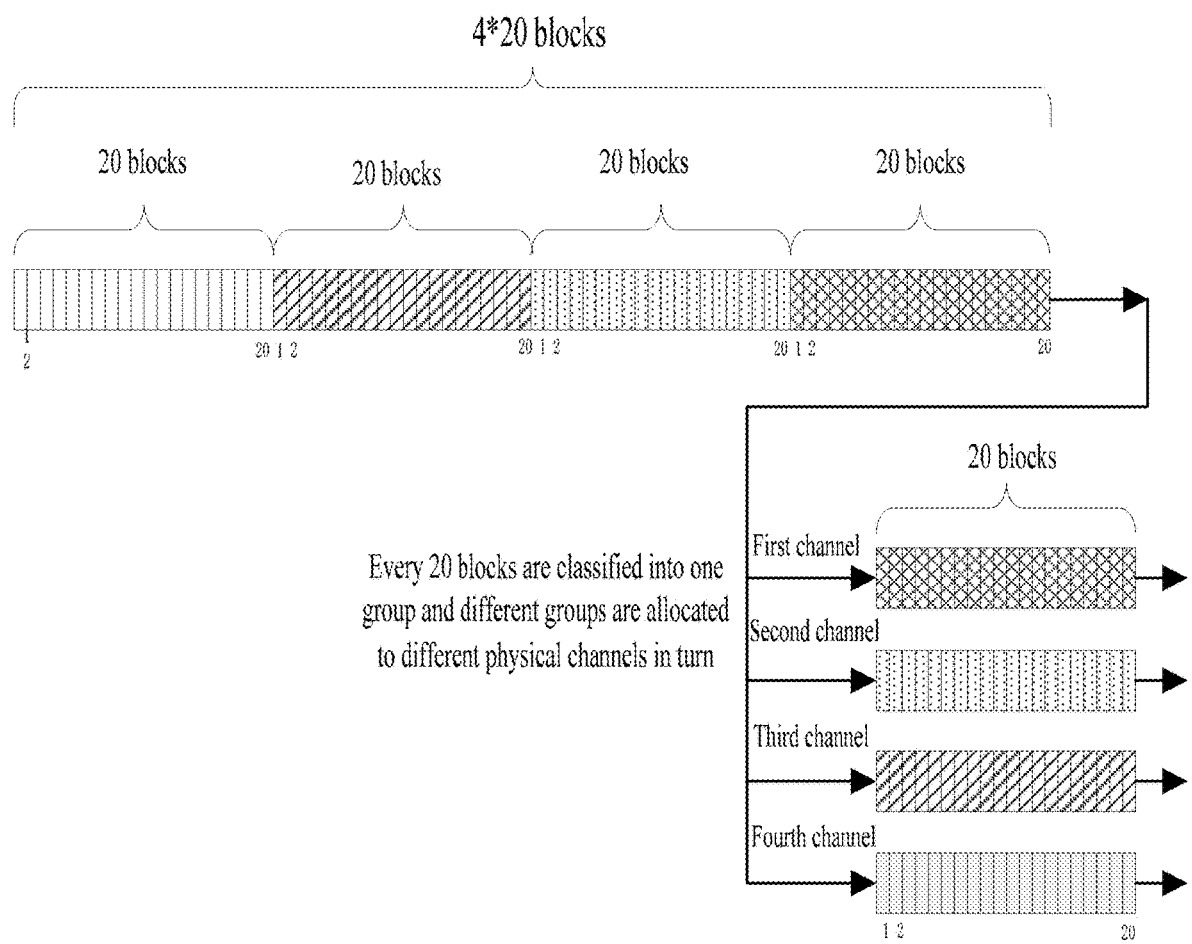
FIG. 6 is a schematic diagram illustrating allocation of services over multiple physical channels in the FlexE protocol according to optional embodiments of the present disclosure.

When four 100 G physical layers are bonded into one 400 G logical service bandwidth, as shown in FIG. 6, in each physical layer, 20 data blocks are classified into one data block group, and one overhead byte is inserted every 1023 data block groups. In the FlexE shim layer, four 20 data blocks are combined into one data block group consisting of 80 data blocks. The data block group has 80 timeslots. A customer service is transmitted in the 80 timeslots. Each timeslot has a bandwidth of 5 and the total service transmission bandwidth is 400 G.

The FlexE overhead block is a 66-bit-long overhead block. When a service data stream is sent, one overhead block is inserted every 1023×20 blocks. An overhead block plays a positioning function in the entire service flow. When an overhead block is found, the position of the first data block group and the position of the subsequent data block group in a service can be known. The content of an overhead block is as shown in FIG. 7, eight consecutive overhead blocks (that is, overhead blocks for eight consecutive data block groups) constitute one overhead frame. One overhead block is composed of a 2-bit block flag and 64-bit block content. The block flag is in the first two columns while the block content is in the subsequent 64 columns. The block flag of first overhead block is 10 while the block flag of the subsequent seven overhead blocks is 01 or SS (SS means that the content is uncertain). The content of the first overhead block is: "0x4B" (8 bits, hexadecimal 4B), C bit (1 bit, indicating adjustment control), OMF bit (1 bit, indicating overhead multiframe), RPF bit (1 bit, indicating remote defect), RES bit (1 bit, reserved bit), FlexE group number (20 bits, indicating the number of the bond group), 0x5 (4 bits, hexadecimal 5), 000000 (28 bits, all 0s). 0x4B and 0x5 are the flag indicators of the first overhead block. During receiving, when it is found that the corresponding positions in an overhead block are 0x4B and 0x5, it indicates that this overhead block is the first overhead block in the overhead frame, and this overhead block and the subsequent seven consecutive overhead blocks constitute one overhead frame. In the overhead frame, the reserved part is reserved content, which has not been defined yet and is indicated by the black block in FIG. 7. Other byte content in the overhead frame is not related to the method in this optional embodiment, and will not be described in detail.

Figure 8:
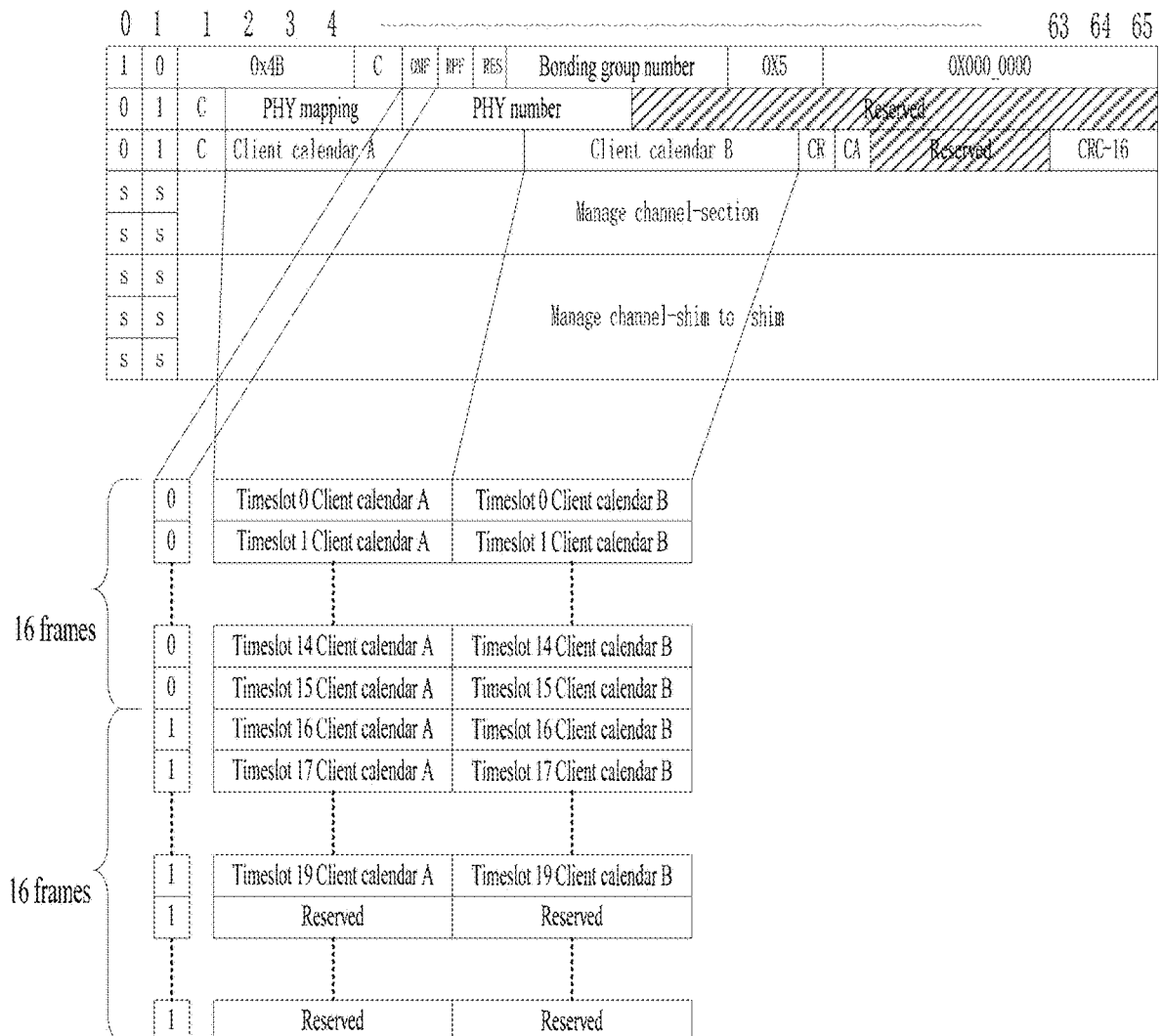
FIG. 8 is a schematic diagram illustrating a multiframe structure in the FlexE protocol according to optional embodiments of the present disclosure.

According to the FlexE protocol, eight overhead blocks form one frame. As shown in FIG. 7, among the eight overhead blocks, the first overhead block is indicated by two fields 4B (which is hexadecimal and indicated by "0"x4B) and 05 (which is hexadecimal and indicated by "0"x5). When it is detected that, in an overhead block, the content in the corresponding positions is 4B and 05, it indicates that this overhead block is the first overhead block, and this overhead block and the subsequent seven consecutive overhead blocks constitute one overhead frame. In the first overhead block, the OMF field is a multiframe indication signal, as shown in FIG. 8. OMF is a single-bit value, which is "0" in 16 consecutive frames, then "1" in 16 consecutive frames, then "0" in 16 consecutive frames, and then "1" in 16 consecutive frames, repeated every 32 frames. In this way, one multiframe is composed of 32 frames.

In the overhead frame, the Client calendar field indicates the configuration information of each timeslot. There are two sets of configuration information: Client calendar A and Client calendar B. The configuration value of Client calendar A and the configuration value of Client calendar B work in the working mode and the standby mode respectively for dynamic and smooth switch between configuration information. At one time point, merely one configuration value is in the working mode and the other configuration value is in the standby mode. If the configuration value needs to be modified, the configuration value in the standby mode is modified. At the same time, the opposite end is notified that the configuration value of the local port has changed. The opposite end makes a preparation according to the new configuration value. After the preparation is completed, the opposite end performs sending back to the initiating end. After the two ends reach a consensus, the configuration table that is originally in the working mode is modified to be in the standby mode while the configuration table that is originally in the standby mode is modified to be in the working mode, achieving dynamic adjustment of the configuration information. There are 20 timeslots in a 100 G physical layer. Each timeslot requires one configuration table. A total of 20 configuration tables are required. The OMF value indicates the multiframe structure, one multiframe consists of 32 frames. In such way, the configuration table of merely one timeslot is transmitted in one frame. Transmission of the configuration information of all timeslots can be completed in 20 frames, and the configuration information positions in the remaining 12 frames are reserved fields, which is shown in FIG. 8.

Figure 9:
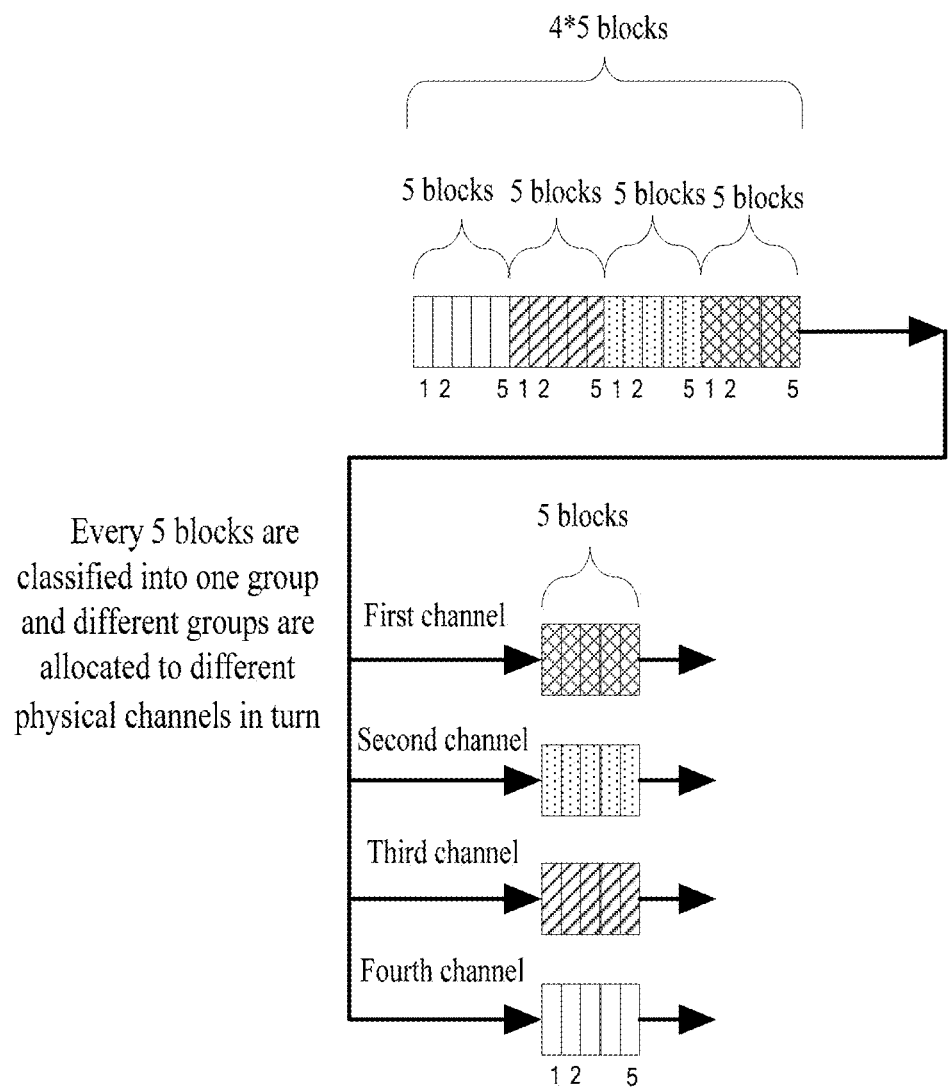
FIG. 9 is a schematic diagram illustrating modification of a physical layer from 100 G to 25 G when the FlexE protocol is extended according to optional embodiments of the present disclosure.
Figure 10:
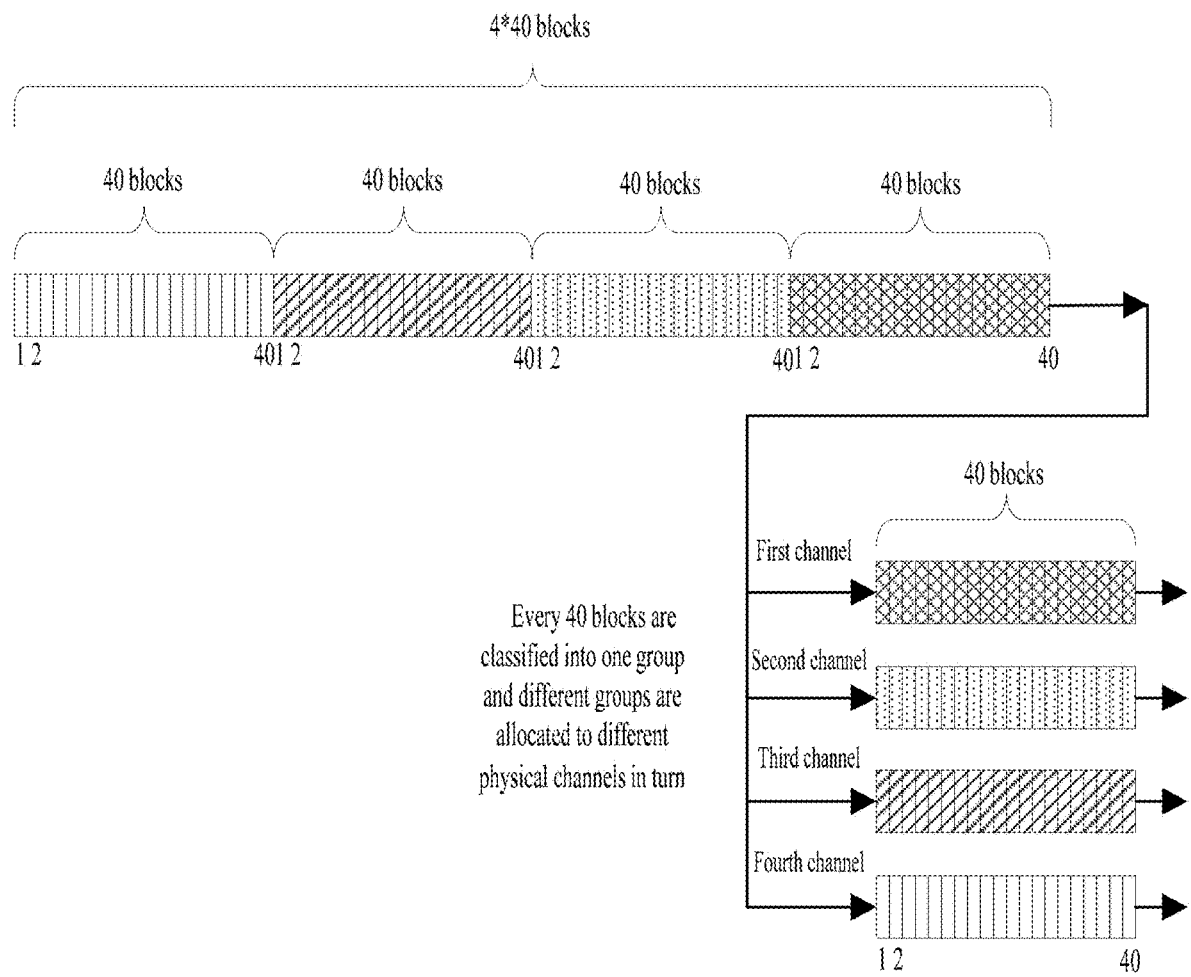
FIG. 10 is a schematic diagram illustrating modification of a physical layer from 100 G to 200 G when the FlexE protocol is extended according to optional embodiments of the present disclosure.
Figure 11:
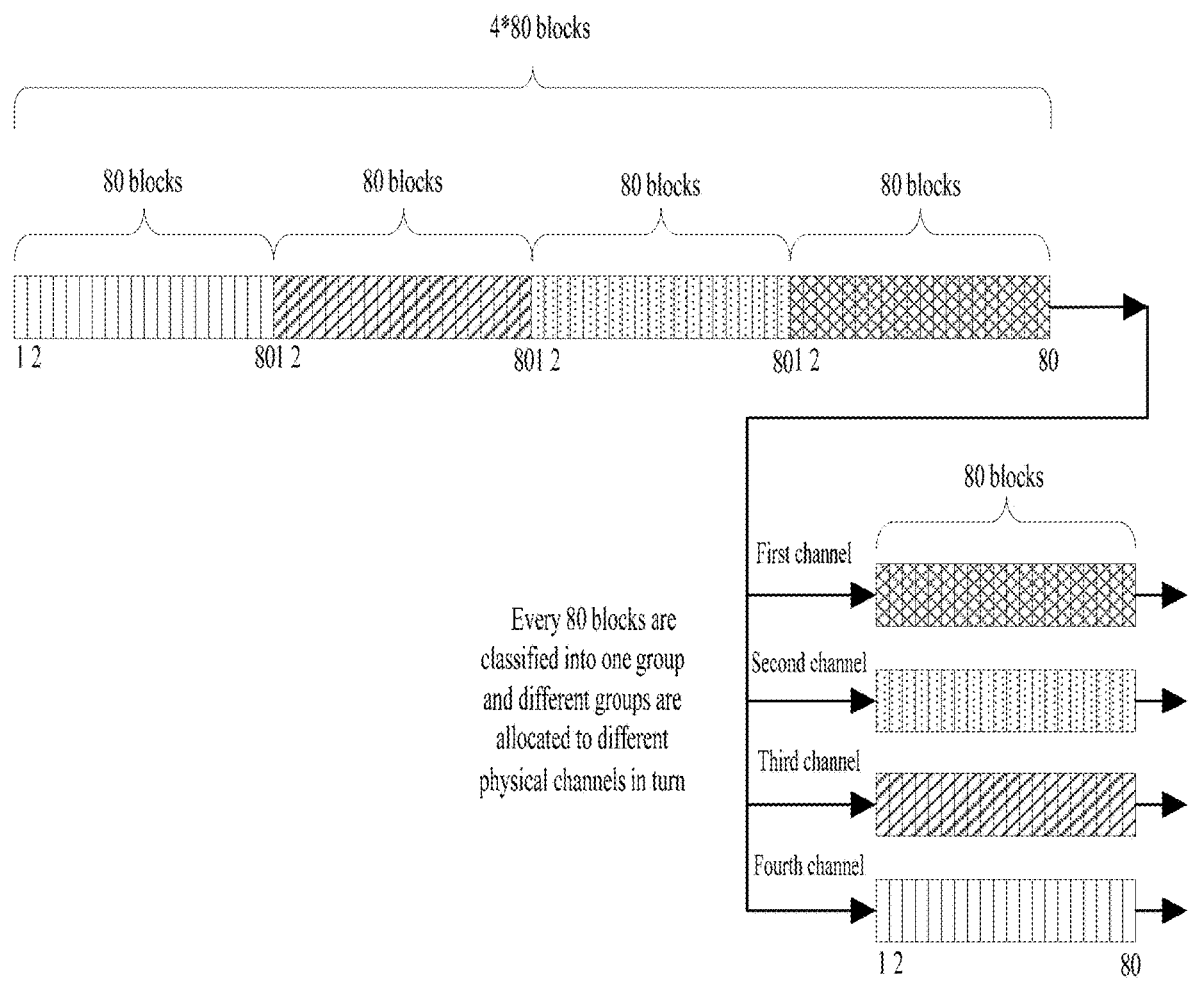
FIG. 11 is a schematic diagram illustrating modification of a physical layer from 100 G to 400 G when the FlexE protocol is extended according to optional embodiments of the present disclosure.

When a physical layer is extended from 100 G to 25 each timeslot remains 5 so the physical layer needs merely 5 timeslots. See FIG. 9. When a physical layer is extended from 100 G to 200 each timeslot remains 5 so the physical layer needs merely 40 timeslots. See FIG. 10. Similarly, when a physical layer is extended from 100 G to 400 each timeslot remains 5 so the physical layer needs merely 80 timeslots. See FIG. 11. Since the number of timeslots of each physical layer changes, each timeslot needs configuration information, and the transmission mode of configuration information of each timeslot needs to be defined. The original multiframe format defined by the FlexE protocol is suitable for merely a 100 G physical layer and not suitable for a physical layer having other rates. This optional embodiment provides a multiframe indication mode for different physical bandwidths and different number of timeslots.

The multiframe indication method in the FLEXE protocol provided in this optional embodiment of the present disclosure includes the steps described below.

In step 1, a multiframe identifier pattern (which has the same function as the preceding multiframe identifier) is determined at the sending end. The multiframe identifier pattern is composed of consecutive "0"s and consecutive "1"s. The number of consecutive "0"s and the number of consecutive "1"s are related to the number of timeslots of the physical layer.

Step 1 may include the steps described below.

In step 1.1, the number of timeslots of the physical layer is determined in the overhead frame structure of the FlexE protocol.

The number of timeslots of the physical layer can be determined according to the bandwidth of the physical layer. The bandwidth of each timeslot may be 5 G. From the bandwidth of the physical layer divided by 5G, the number of timeslots of the physical layer is obtained. For a 10 G physical layer, the number of timeslots is 2. For a 25 G physical layer, the number of timeslots is 5. For a 40 G physical layer, the number of timeslots is 8. For a 50 G physical layer, the number of timeslots is 10. For a 200 G physical layer, the number of timeslots is 40. For a 400 G physical layer, the number of timeslots is 80.

In step 1.2, the multiframe number is determined according to the number of timeslots of the physical layer, that is, the number of frames constituting one multiframe is determined.

Step 1.2 may include the steps described below.

In step 1.2.1, the multiframe number m greater than the number of timeslots is determined according to the number of timeslots of the physical layer. The multiframe number m is equal to nth power of 2. n is the minimum positive integer that satisfies the constraint condition (that the multiframe number is greater than the number of timeslots).

In step 1.2.1, the multiframe number m greater than the number of timeslots is searched for. The multiframe number m is equal to nth power of 2. n is the minimum positive integer that satisfies the constraint condition (that the multiframe number is greater than the number of timeslots). For example, for a 25 G physical layer, when the number of timeslots is 5, the multiframe number m is equal to nth power of 2, and n may be selected from 1, 2, 3, 4, 5, . . . (positive integers greater than 0). However, when n is 1 or 2, the multiframe number is 2 and 4, not satisfying the condition that the multiframe number is greater than the number of timeslots; when n is 3, 4, 5, . . . , the multiframe number is 8, 16, 32, . . . , satisfying the condition that the multiframe number is greater than the number of timeslots. Of these selectable values, 3 is the minimum positive integer, so 3 is selected as the value of n. The rest can be done in the same manner. For a 200 G physical layer, in condition that the number of timeslots is 40, then n is 6 and the multiframe number m is the 6th power of 2, so the multiframe number is 64, which is greater than the number of timeslots 40. For a 400 G physical layer, in condition that the number of timeslots is 80, then n is 7 and the multiframe number m is the 7th power of 2, so the multiframe number is 128, which is greater than the number of timeslots 80. That is, if the number of timeslots is 5, then n is 3 and the multiframe number m is the 3th power of 2, so the multiframe number is 8, which is greater than the number of timeslots 5; if the number of timeslots is 40, then n is 6 and the multiframe number m is the 6th power of 2, so the multiframe number is 64, which is greater than the number of timeslots 40; if the number of timeslots is 80, then n is 7 and the multiframe number m is the 7th power of 2, so the multiframe number is 128, which is greater than the number of timeslots 80.

In step 1.2.2, it is determined that the number of consecutive "0"s in the multiframe identifier pattern is equal to half of the multiframe number, the number of consecutive "1"s in the multiframe identifier pattern is also equal to half of the multiframe number, and a character string consisting of the consecutive "0"s and the consecutive "1"s constitutes the multiframe identifier pattern.

It is to be noted that the number of "0"s and "1"s constituting the multiframe pattern may also be other values as long as the sum of the number of consecutive "0"s and the number of consecutive "1"s is equal to the determined multiframe number. For the sake of symmetry and easy design, the number of consecutive "0"s and the number of consecutive "1"s are equal in this optional embodiment.

In step 1.3, the number of consecutive "0"s and the number of consecutive "1"s of the OMF field in the overhead are determined according to the multiframe number. The number of consecutive "0"s is equal to half of the multiframe number, the number of consecutive "1"s is also equal to half of the multiframe number, and the information bits of the consecutive "0"s and the consecutive "1"s constitute the multiframe identifier pattern.

After the multiframe number is determined, it is determined that the number of consecutive "0"s of the OMF is half of the multiframe number, the number of consecutive "1"s of the OMF is also half of the multiframe number, and a character string consisting of the consecutive "0"s and the consecutive "1"s constitutes the multiframe identifier pattern.

In step 2, the OMF field is cyclically sent out according to the determined multiframe identifier pattern at the sending end.

Figure 12:
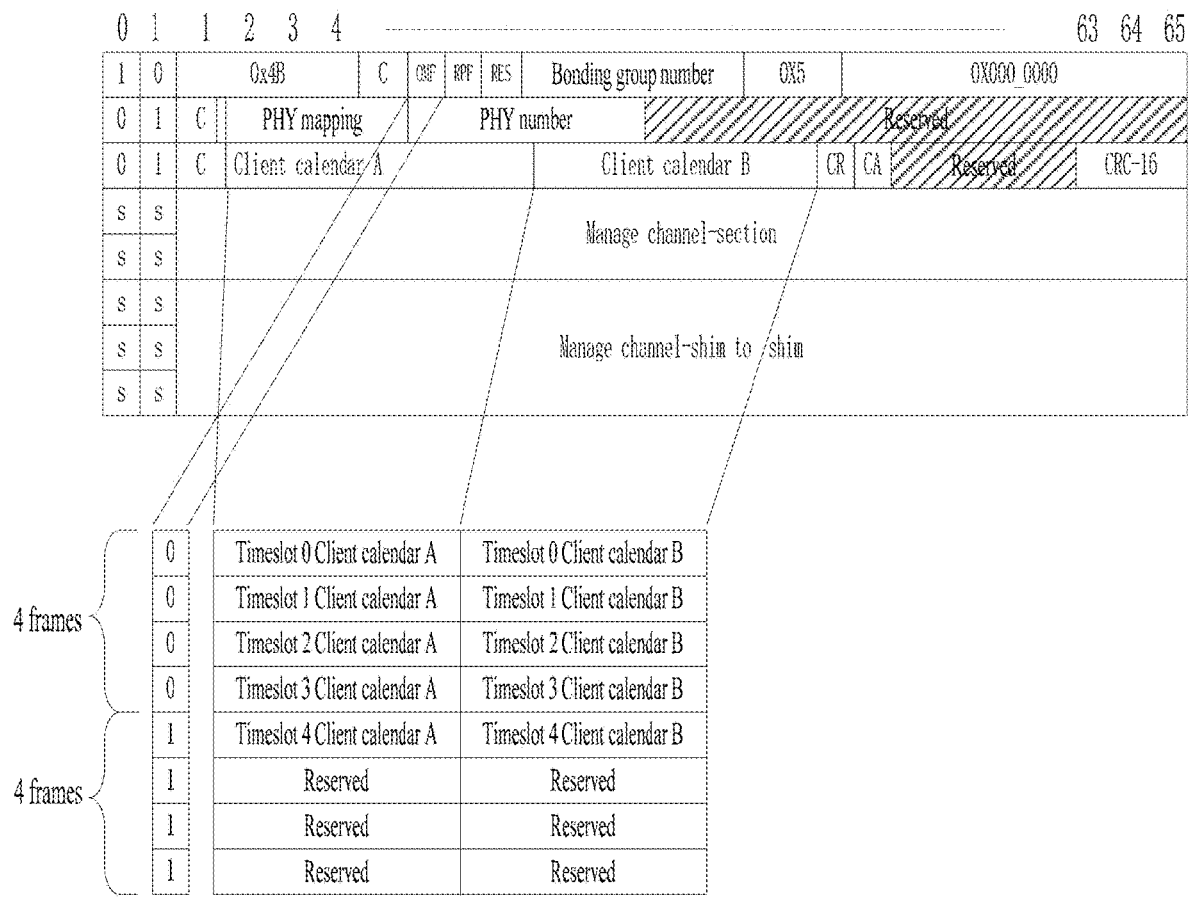
FIG. 12 is a schematic diagram illustrating a multiframe structure in the case of a 25 G physical layer when the FlexE protocol is extended according to optional embodiments of the present disclosure.
Figure 13:
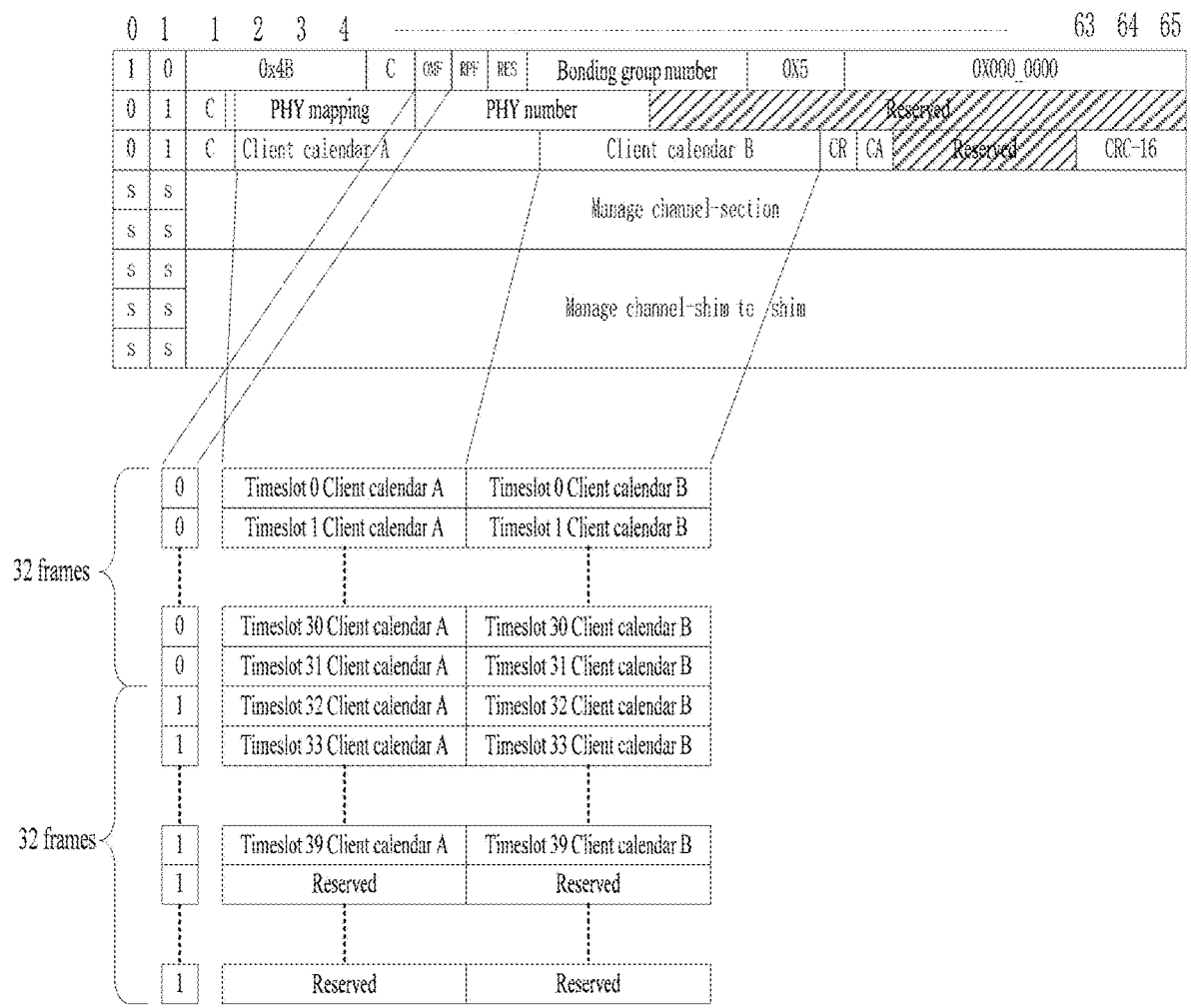
FIG. 13 is a schematic diagram illustrating a multiframe structure in the case of a 200 G physical layer when the FlexE protocol is extended according to optional embodiments of the present disclosure.
Figure 14:
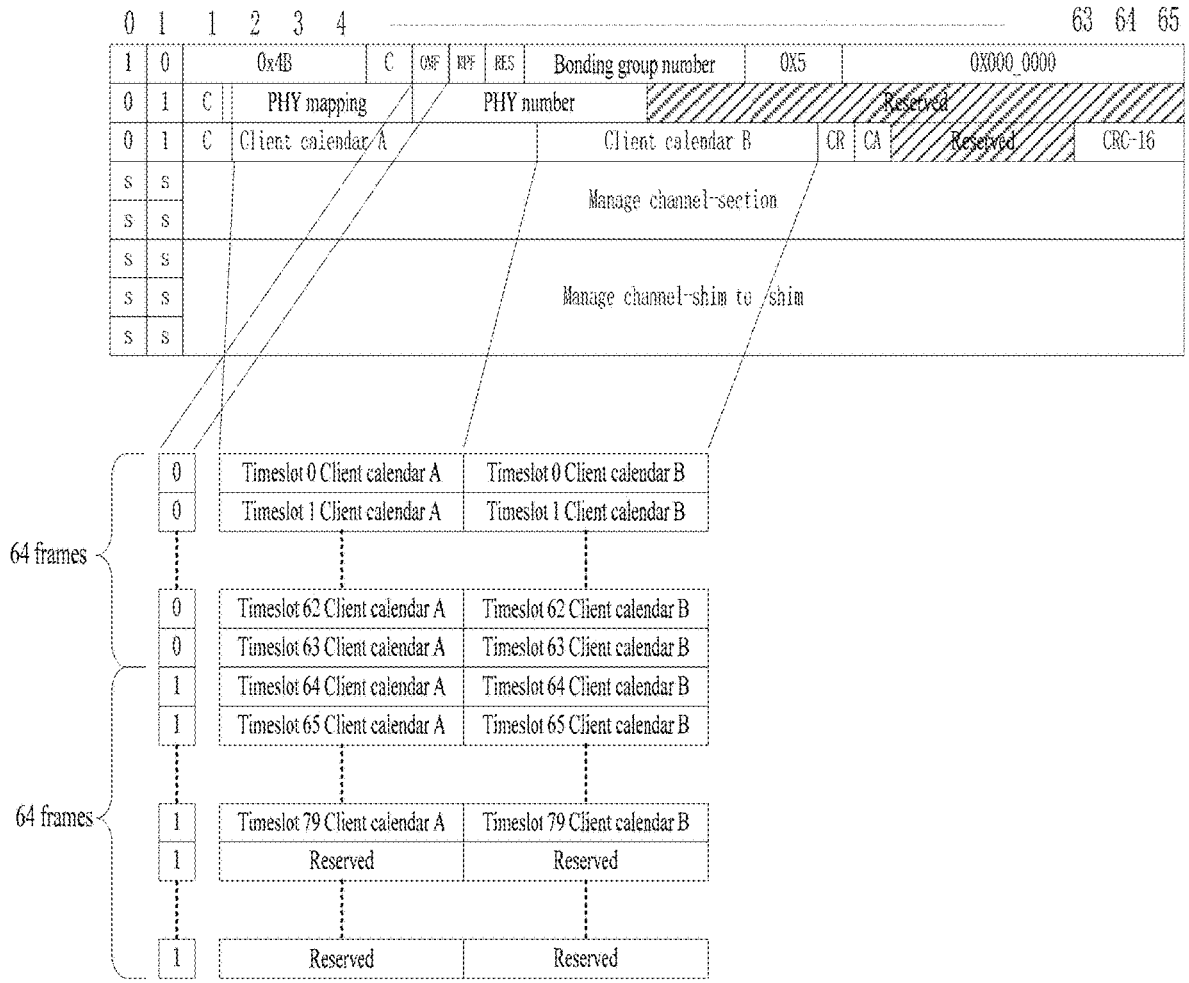
FIG. 14 is a schematic diagram illustrating a multiframe structure in the case of a 400 G physical layer when the FlexE protocol is extended according to optional embodiments of the present disclosure.

At the sending end, the OMF is sent according to the multiframe identifier pattern. The part consisting of the consecutive "0"s is first sent, and then the part consisting of the consecutive "1"s is sent. After one multiframe is completed, the multiframe identifier pattern is sent repeatedly. See FIGS. 12, 13 and 14.

In step 3, the content of the OMF field is extracted at the receiving end, whether the received multiframe identifier pattern is correct is determined according to the determined multiframe identifier pattern, and the multiframe boundary is determined.

A FlexE protocol multiframe indication method provided in this optional embodiment is applicable to a FlexE protocol multiframe indication apparatus. The apparatus includes the following three parts: a multiframe pattern information generating module, a multiframe pattern information receiving module and a multiframe pattern determining module.

At the sending end, a multiframe pattern product module determines the multiframe information pattern according to the speed of the physical layer.

The multiframe identifier pattern is composed of consecutive "0"s and consecutive "1"s. The number of consecutive "0"s and the number of consecutive "1"s are related to the number of timeslots of the physical layer. The number of consecutive "0"s is equal to half of the multiframe number, the number of consecutive "1"s is also equal to half of the multiframe number, and information bits consisting of the consecutive "0"s and the consecutive "1"s constitute the multiframe identifier pattern. The multiframe number satisfies this condition: (1) the multiframe number m is greater than the number of timeslots; (2) the multiframe number m is equal to the nth power of 2, and n is the minimum positive integer that satisfies the constraint condition (the multiframe number is greater than the number of timeslots).

For example, for a 25 G physical layer, the number of timeslots is 5, the multiframe number is 8, one multiframe consists of 8 frames, the multiframe pattern is 00001111, the number of consecutive "0"s is 4, the number is consecutive "1"s is 4, and a total of 8 frames (that is, every 8 frames) are one cycle; for a 50 G physical layer, the number of timeslots is 10, the multiframe number is 16, one multiframe consists of 16 frames, the multiframe pattern is 0000000011111111, the number of consecutive "0"s is 8, the number is consecutive "1"s is 8, and a total of 16 frames (that is, every 16 frames) are one cycle; for a 200 G physical layer, the number of timeslots is 40, the multiframe number is 64, one multiframe consists of 64 frames, the multiframe pattern is 00000000000000000000000000000000 11111111-1111111111111111111111111, the number of consecutive "0"s is 32, the number is consecutive "1"s is 32, and a total of 64 frames (that is, every 64 frames) are one cycle; for a 400 G physical layer, the number of timeslots is 80, the multiframe number is 128, one multiframe consists of 128 frames, the multiframe pattern is 00000000000000000-0000000000000000000000000000000000000000-1111111111111111 1111111111111111111111-1111111111111111111111, the number of consecutive "0"s is 64, the number is consecutive "1"s is 64, and a total of 128 frames (that is, every 128 frames) are one cycle.

At the receiving end, the multiframe pattern information receiving module extracts the content of the OMF field in the received FlexE frame, and saves the extracted content; the multiframe pattern determining module detects whether the received content is correct according to the multiframe identifier pattern format of the sending end. In the case where the multiframe pattern is correct, the multiframe boundary is given, and the position of the first frame in the multiframe is given.

Through the preceding technical solutions in optional embodiments of the present disclosure in which the sending end determines the multiframe number according to the number of timeslots of the physical layer, determines the multiframe identifier pattern according to the determined multiframe number, and cyclically sends the receiving end the determined multiframe identifier pattern in preset positions (for example, OMF field) of overhead frames; the receiving end extracts the content of the OMF field, gives the multiframe boundary according to the determined multiframe identifier pattern, and gives the multiframe indication mode for different physical bandwidths and different number of timeslots, the compatibility of the multiframe indication mode in the FlexE protocol is improved.

From the description of the embodiments described above, it will be apparent to those skilled in the art that the methods in the embodiments described above may be implemented by software plus a necessary general-purpose hardware platform, or may of course be implemented by hardware. However, in many cases, the former is a preferred implementation mode. Based on this understanding, the solutions provided in the present disclosure substantially, or the part contributing to the existing art, may be embodied in the form of a software product. The computer software product is stored in a storage medium (such as a read-merely memory (ROM)/random access memory (RAM), a magnetic disk or an optical disk) and includes several instructions for enabling a terminal device (which may be a mobile phone, a computer, a server, a network device or the like) to execute the methods according to embodiments of the present disclosure.

Embodiment Two

This embodiment further provides an apparatus for sending a multiframe. The apparatus is for implementing the preceding embodiments and optional embodiments. What has been described will not be repeated. As used below, the term "module" may be software, hardware or a combination thereof capable of implementing predetermined functions. The apparatuses in the embodiments described below are preferably implemented by software, but implementation by hardware or by a combination of software and hardware is also possible and conceived.

Figure 15:
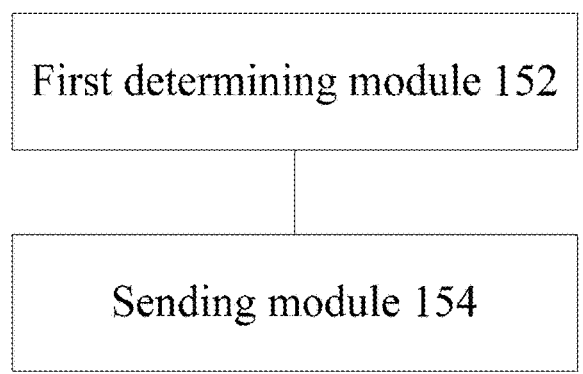
FIG. 15 is block diagram one illustrating a structure of an apparatus for sending a multiframe according to embodiments of the present disclosure.

FIG. 15 is block diagram one illustrating a structure of an apparatus for sending a multiframe according to embodiments of the present disclosure. As shown in FIG. 15, the apparatus includes a first determining module 152 and a sending module 154.

The first determining module 152 is configured to determine, according to the number of timeslots of a physical layer, a multiframe identifier for identifying a multiframe number, where the multiframe number is the number of frames constituting one multiframe.

The sending module 154 is configured to send the multiframe to a receiving end, where the multiframe identifier is carried in the multiframe.

Optionally, the multiframe number may be nth power of 2, where the n is a minimum positive integer that causes the multiframe number greater than or equal to the number of the timeslots.

Optionally, the sending module 154 is further configured to make identifier values of the multiframe identifier sequentially be carried in preset positions of overhead blocks of respective frames constituting the multiframe, wherein the number of the identifier values is the same as the multiframe number.

Figure 16:
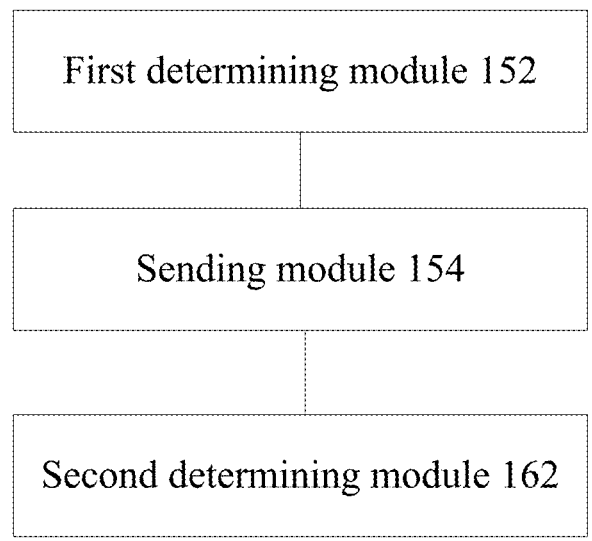
FIG. 16 is block diagram two illustrating a structure of an apparatus for sending a multiframe according to embodiments of the present disclosure.

FIG. 16 is block diagram two illustrating a structure of an apparatus for sending a multiframe according to embodiments of the present disclosure. As shown in FIG. 16, the apparatus further includes a second determining module 162 in addition to all of the modules shown in FIG. 15.

The second determining module 162 is configured to determine the number of the timeslots according to an interface bandwidth speed of the physical layer.

Figure 17:
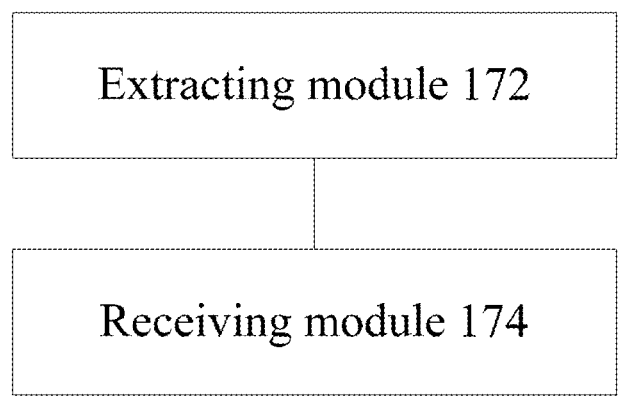
FIG. 17 is block diagram one illustrating a structure of an apparatus for receiving a multiframe according to embodiments of the present disclosure.

An apparatus for receiving a multiframe is further provided in this embodiment. FIG. 17 is block diagram one illustrating a structure of an apparatus for receiving a multiframe according to embodiments of the present disclosure. As shown in FIG. 17, the apparatus includes an extracting module 172 and a receiving module 174.

The extracting module 172 is configured to: extract a multiframe identifier for identifying a multiframe number from received frames, where the multiframe number is the number of frames constituting one multiframe.

The receiving module 174 is connected to the extracting module 172 and configured to receive multiframe data according to the extracted multiframe identifier.

Optionally, the extracting module 172 is further configured to: extract identifier values of the multiframe identifier sequentially in preset positions of overhead blocks of respective received frames, where the number of the identifier values is the same as the multiframe number.

Optionally, the receiving module 174 is further configured to determine a multiframe boundary according to the extracted identifier values of the multiframe identifier; and receive the multiframe data according to the determined multiframe boundary.

Figure 18:
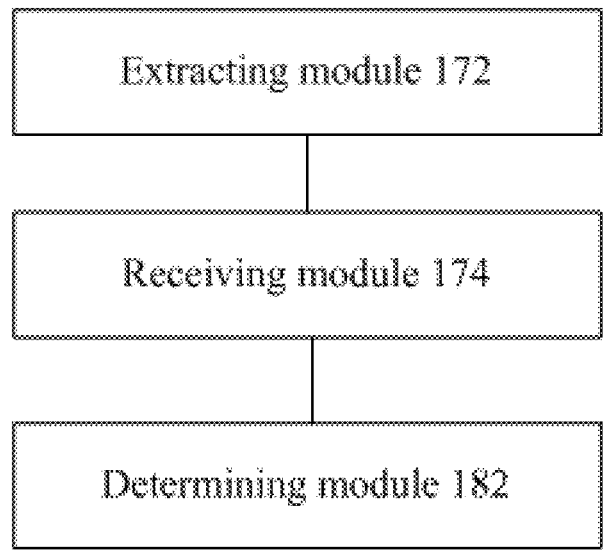
FIG. 18 is block diagram two illustrating a structure of an apparatus for receiving a multiframe according to embodiments of the present disclosure.

FIG. 18 is block diagram two illustrating a structure of an apparatus for receiving a multiframe according to embodiments of the present disclosure. As shown in FIG. 18, the apparatus further includes a determining module 182 in addition to all of the modules shown in FIG. 17. The apparatus is described below.

The determining module 182 is configured to determine whether a received multiframe identifier is correct according to the number of the extracted identifier values and a receiving sequence.

The receiving module 174 is further configured to: in condition that a determining result of the determining module is correct, receive the multiframe data according to the extracted multiframe identifier.

Figure 19:
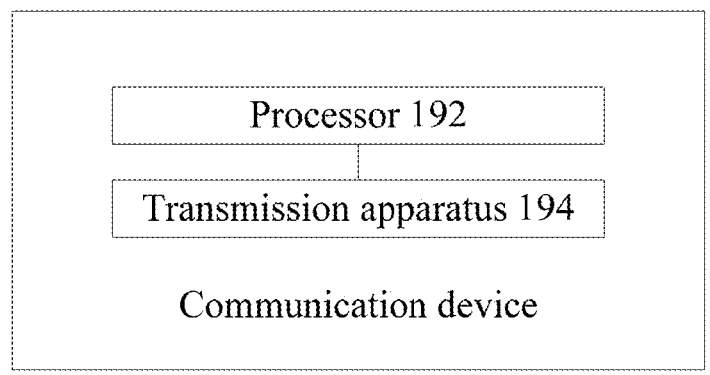
FIG. 19 is block diagram one illustrating a structure of a communication device according to embodiments of the present disclosure.

A communication device is further provided in this embodiment. FIG. 19 is block diagram one illustrating a structure of a communication device according to embodiments of the present disclosure. As shown in FIG. 19, the device includes a processor 192 and a transmission apparatus 194.

The processor 192 is configured to determine, according to the number of timeslots of a physical layer, a multiframe identifier for identifying a multiframe number, wherein the multiframe number is the number of frames constituting one multiframe.

The transmission apparatus 194 is connected to the processor 192 and configured to send the multiframe to a receiving end, where the multiframe identifier is carried in the multiframe.

Optionally, the transmission apparatus 194 is further configured to make identifier values of the multiframe identifier sequentially be carried in preset positions of overhead blocks of respective frames constituting the multiframe, where the number of the identifier values is the same as the multiframe number.

The processor 192 is further configured to determine the number of the timeslots according to an interface bandwidth speed of the physical layer.

Figure 20:
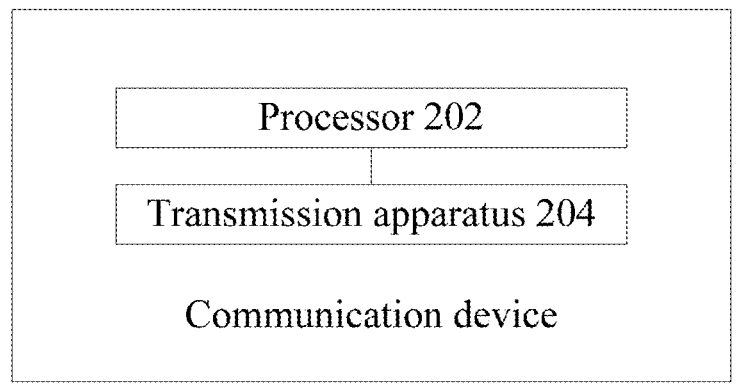
FIG. 20 is block diagram two illustrating a structure of a communication device according to embodiments of the present disclosure.

A communication device is further provided in this embodiment. FIG. 20 is block diagram two illustrating a structure of a communication device according to embodiments of the present disclosure. As shown in FIG. 20, the device includes a processor 202 and a transmission apparatus 204.

The processor 202 is configured to extract a multiframe identifier for identifying a multiframe number from received frames, wherein the multiframe number is the number of frames constituting one multiframe.

The transmission apparatus 204 is connected to the processor 202 and configured to receive the multiframe data according to the extracted multiframe identifier.

Optionally, the processor 202 is further configured to: extract identifier values of the multiframe identifier sequentially in preset positions of overhead blocks of respective received frames, where the number of the identifier values is the same as the multiframe number.

Optionally, the processor 202 is further configured to determine a multiframe boundary according to the extracted identifier values of the multiframe identifier; and receive the multiframe data according to the determined multiframe boundary.

Optionally, the processor 202 is configured to determine whether a received multiframe identifier is correct according to the number of the extracted identifier values and a receiving sequence; and the transmission apparatus 204 is further configured to: in condition that a determining result is correct, receive the multiframe data according to the extracted multiframe identifier.

Figure 21:
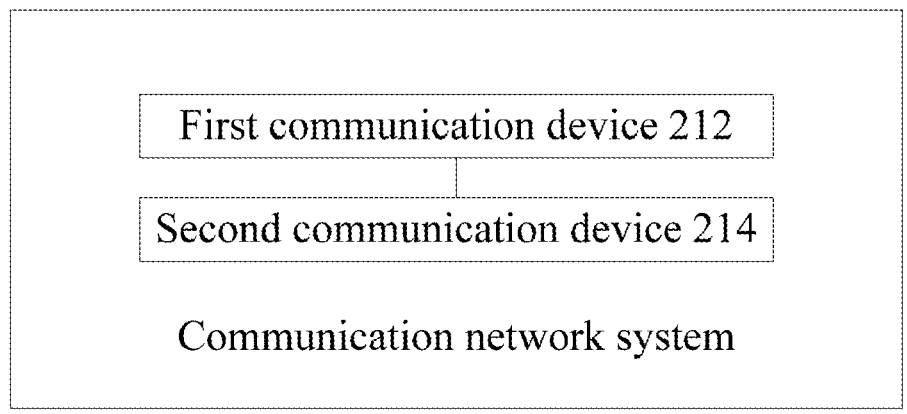
FIG. 21 is a block diagram illustrating a structure of a communication network system according to embodiments of the present disclosure.

A communication network system is further provided in this embodiment. FIG. 21 is a block diagram illustrating a structure of a communication network system according to embodiments of the present disclosure. As shown in FIG. 21, the device includes a first communication device 212 and a second communication device 214.

The first communication device 212 is configured to determine, according to the number of timeslots of a physical layer, a multiframe identifier for identifying a multiframe number, where the multiframe number is the number of frames constituting one multiframe; and send the multiframe to a receiving end, where the multiframe identifier is carried in the multiframe.

The second communication device 214 is connected to the first communication device 212 and configured to: extract a multiframe identifier for identifying a multiframe number from received frames; and receive multiframe data according to the extracted multiframe identifier.

Optionally, the first communication device 212 is further configured to make identifier values of the multiframe identifier sequentially be carried in preset positions of overhead blocks of respective frames constituting the multiframe, where the number of the identifier values is the same as the multiframe number; and the second communication device 214 is further configured to: extract the identifier values of the multiframe identifier sequentially in the preset positions of the overhead blocks of respective received frames.

Optionally, the second communication device 214 is further configured to determine whether a received multiframe identifier is correct according to the number of the extracted identifier values of the multiframe identifier and a receiving sequence; when a determining result is correct, determine a multiframe boundary according to the extracted identifier values of the multiframe identifier; and receive the multiframe data according to the determined multiframe boundary.

The first communication device 212 and the second communication device 214 may be two sides for sending and receiving data. For example, if the first communication device 212 is a sending end, the second communication device 214 is a receiving end; if the second communication device 214 is a sending end, and the first communication device 212 is a receiving end.

It is to be noted that the preceding modules may be implemented by software or hardware. Implementation by hardware may, but may not necessarily, be performed in the following manner: the preceding modules are located in a same processor, or the preceding modules are located in any combination in different processors.

Embodiment Three

A computer storage medium is provided in embodiments of the present disclosure. Optionally, in this embodiment, the computer storage medium may be configured to store computer-executable codes such as program codes or application software for executing the steps described below.

In S1, a multiframe identifier for identifying a multiframe number is determined according to the number of timeslots of a physical layer, wherein the multiframe number is the number of frames constituting one multiframe. In this embodiment, the multiframe identifier may be composed of multiple bits for indicating the number of the multiframes.

In S2, the multiframe is sent to a receiving end, where the multiframe identifier is carried in the multiframe. The multiframe identifier may correspond to a character string. Characters in the character string may be dispersed in different frames of the multiframe in a preset carrying mode. For example, one or more bits are reserved in the preset position of each frame to carry a part of the character string of the multiframe identifier.

Optionally, the computer storage medium is further configured to store computer-executable programs such as program codes or application software for executing the following step: the multiframe number is nth power of 2, where the n is a minimum positive integer that causes the multiframe number greater than or equal to the number of the timeslots.

Optionally, the computer storage medium is further configured to store computer-executable programs such as program codes or application software for executing the following step: identifier values of the multiframe identifier are sequentially carried in preset positions of overhead blocks of respective frames constituting the multiframe, where the number of the identifier values is the same as the multiframe number.

Optionally, the computer storage medium is further configured to store program codes for executing the following step: the identifier values of the multiframe identifier are a preset number of consecutive "0"s and the preset number of consecutive "1"s in sequence, where the multiframe number is an even number and the preset number is half of the multiframe number.

Optionally, the computer storage medium is further configured to store computer-executable programs such as program codes or application software for executing the following step: a preset position is an Overhead Multiframe Indicator (OMF) field of respective one of the overhead blocks.

Optionally, the computer storage medium is further configured to store computer-executable programs such as program codes or application software for executing the step described below.

Before determining, according to the number of the timeslots of the physical layer, the multiframe identifier for identifying the multiframe number, the method further includes: determining the number of the timeslots according to an interface bandwidth speed of the physical layer.

A computer storage medium is further provided in embodiments of the present disclosure. Optionally, in this embodiment, the computer storage medium is further configured to store computer-executable programs such as program codes or application software for executing the steps described below.

In S1, in a multiframe identifier for identifying a multiframe number is extracted from received frames, where the multiframe number is the number of frames constituting one multiframe.

In S2, multiframe data is received according to the extracted multiframe identifier.

Optionally, the computer storage medium is further configured to store computer-executable programs such as program codes or application software for executing the step described below.

Extracting the multiframe identifier for identifying the multiframe number from the received frames includes: extracting identifier values of the multiframe identifier sequentially in preset positions of overhead blocks of respective received frames, where the number of the identifier values is the same as the multiframe number.

Optionally, the computer storage medium is further configured to store computer-executable programs such as program codes or application software for executing the following step: a preset position is an Overhead Multiframe Indicator (OMF) field of one of the overhead blocks.

Optionally, the computer storage medium is further configured to store computer-executable programs such as program codes or application software for executing the steps described below.

The step of receiving multiframe data according to the extracted multiframe identifier includes the steps described below:

In S1, a multiframe boundary is determined according to the extracted identifier values of the multiframe identifier.

In S2, the multiframe data is received according to the determined multiframe boundary.

Optionally, the storage medium is further configured to store program codes for executing the steps described below.

After the step of extracting the multiframe identifier for identifying the multiframe number from the received frames, the method further includes the step described below.

In S1, whether a received multiframe identifier is correct is determined according to the number of the extracted identifier values and a receiving sequence.

The step of receiving multiframe data according to the extracted multiframe identifier includes the step described below.

In S2, in condition that a determining result is correct, the multiframe data is received according to the extracted multiframe identifier.

Optionally, in this embodiment, the computer storage medium may include, but is not limited to, a USB flash disk, a read-merely memory (ROM), a random access memory (RAM), a mobile hard disk, a magnetic disk, an optical disk or another medium capable of storing the program codes. Optionally, the computer storage medium may be a non-transitory storage medium.

Optionally, in this embodiment, a processor executes the steps in the methods described in the preceding embodiments according to the program codes stored in the storage medium. The processor may be a central processing unit, a microprocessor, a digital signal processor, an application processor, a programmable gate array or an application specific integrated circuit.

Optionally, for specific examples in this embodiment, reference may be made to the examples described in the preceding embodiments and optional embodiments, and the specific examples will not be repeated in this embodiment.

Apparently, it is to be understood by those skilled in the art that each of the preceding modules or steps of the present disclosure may be implemented by a general-purpose computing apparatus, the modules or steps may be concentrated on a single computing apparatus or distributed on a network composed of multiple computing apparatuses, and alternatively, the modules or steps may be implemented by program codes executable by the computing apparatuses, so that the modules or steps may be stored in a storage apparatus and executed by the computing apparatuses. In some circumstances, the illustrated or described steps may be executed in sequences different from those described herein, or the modules or steps may be made into various integrated circuit modules separately, or multiple modules or steps therein may be made into a single integrated circuit module for implementation. In this way, the present disclosure is not limited to any specific combination of hardware and software.

The preceding are merely optional embodiments of the present disclosure and are not intended to limit the present disclosure, and for those skilled in the art, the present disclosure may have various modifications and variations. Any modifications, equivalent substitutions, improvements and the like made within the spirit and principle of the present disclosure should fall within the scope of the present disclosure.

What is claimed is:

1. A method for sending a multiframe, comprising:
sending a multiframe to a receiving end, wherein a multiframe identifier is carried in the multiframe and a multiframe number is identified by the multiframe identifier, the multiframe number is a number of frames constituting the multiframe, identifier values of the multiframe identifier are sequentially carried in preset positions of overhead blocks of respective frames constituting the multiframe, and the number of the identifier values of the multiframe identifier is the same as the multiframe number;
in a case where an interface bandwidth speed of the physical layer is 25 Gbit/s, the number of timeslots is five, the multiframe number is eight, and the identifier values of the multiframe identifier are four consecutive "0"s and four consecutive "1"s in sequence;

wherein each of the preset positions is an Overhead Multiframe Indicator (OMF) field of respective one of the overhead blocks in a Flexible Ethernet (FlexE) protocol, a multiframe boundary is determined according to the identifier values of the multiframe identifier, and the multiframe boundary is used to determine start and end positions of each multiframe;

wherein whether the multiframe identifier is correctly received according to the number of the identifier values of the multiframe identifier and a receiving sequence.

2. A method for sending a multiframe, comprising:

sending a multiframe to a receiving end, wherein a multiframe identifier is carried in the multiframe and a multiframe number is identified by the multiframe identifier, the multiframe number is a number of frames constituting the multiframe, identifier values of the multiframe identifier are sequentially carried in preset positions of overhead blocks of respective frames constituting the multiframe, and the number of the identifier values of the multiframe identifier is the same as the multiframe number;

in a case where an interface bandwidth speed of the physical layer is 50 Gbit/s, the number of timeslots is ten, the multiframe number is sixteen, and the identifier values of the multiframe identifier are eight consecutive "0"s and eight consecutive "1"s in sequence;

wherein each of the preset positions is an Overhead Multiframe Indicator (OMF) field of respective one of the overhead blocks in a Flexible Ethernet (FlexE) protocol, a multiframe boundary is determined according to the identifier values of the multiframe identifier, and the multiframe boundary is used to determine start and end positions of each multiframe;

wherein whether the multiframe identifier is correctly received according to the number of the identifier values of the multiframe identifier and a receiving sequence.

3. A communication device, comprising: at least one processor; and a memory communicably connected with the at least one processor and configured for storing computer-executable instructions executable by the at least one processor, wherein the computer-executable instructions when executed by the at least one processor cause the at least one processor to perform the method for sending a multiframe of claim 1.

4. A communication device, comprising: at least one processor; and a memory communicably connected with the at least one processor and configured for storing computer-executable instructions executable by the at least one processor, wherein the computer-executable instructions when executed by the at least one processor cause the at least one processor to perform the method for sending a multiframe of claim 2.

* * * * *